(12) United States Patent
Geoffrey (10) Patent No.: US 8,799,675 B2
(45) Date of Patent: Aug. 5, 2014

(54) SYSTEM AND METHOD FOR ELECTRONIC CERTIFICATION AND AUTHENTICATION OF DATA

(75) Inventor: Mohammed Alawi Geoffrey, Jeddah (SA)

(73) Assignee: House of Development LLC, Jeddah (SA)

( * ) Notice: Subject to any disclaimer, the term of this patent is extended or adjusted under 35 U.S.C. 154(b) by 38 days.

(21) Appl. No.: 13/344,345

(22) Filed: Jan. 5, 2012

(65) Prior Publication Data

US 2013/0179694 A1 Jul. 11, 2013

(51) Int. Cl.
*G06F 21/24* (2006.01)

(52) U.S. Cl.
USPC ........... 713/189; 713/176; 713/155; 713/156; 380/45; 380/285

(58) Field of Classification Search
USPC ............. 713/176, 189, 155–156; 380/45, 285
See application file for complete search history.

(56) References Cited

U.S. PATENT DOCUMENTS

| | | | | |
|---|---|---|---|---|
| 5,136,646 | A | * | 8/1992 | Haber et al. ................... 713/178 |
| 5,136,647 | A | * | 8/1992 | Haber et al. ................... 713/178 |
| 5,241,599 | A | | 8/1993 | Bellovin et al. |
| 5,530,757 | A | * | 6/1996 | Krawczyk ..................... 713/188 |
| 5,604,802 | A | | 2/1997 | Holloway |
| 5,606,609 | A | | 2/1997 | Houser et al. |
| 5,615,268 | A | | 3/1997 | Bisbee et al. |
| 5,660,176 | A | | 8/1997 | Iliff |
| 5,661,805 | A | | 8/1997 | Miyauchi |
| 5,781,629 | A | * | 7/1998 | Haber et al. ................... 713/177 |
| 5,805,702 | A | | 9/1998 | Curry et al. |
| 5,872,848 | A | | 2/1999 | Romney et al. |
| 5,933,498 | A | | 8/1999 | Schneck et al. |
| 5,946,660 | A | | 8/1999 | McCarty et al. |
| 6,044,350 | A | * | 3/2000 | Weiant et al. ................... 705/76 |
| 6,085,322 | A | | 7/2000 | Romney et al. |
| 6,105,007 | A | | 8/2000 | Norris |
| 6,105,013 | A | | 8/2000 | Curry et al. |
| 6,128,391 | A | | 10/2000 | Denno et al. |
| 6,148,093 | A | | 11/2000 | McConnell et al. |
| 6,167,517 | A | | 12/2000 | Gilchrist et al. |

(Continued)

FOREIGN PATENT DOCUMENTS

| | | |
|---|---|---|
| DE | 101 03 044 | 7/2002 |
| DE | 101 38 763 | 2/2003 |

(Continued)

*Primary Examiner* — Kambiz Zand
*Assistant Examiner* — Tongoc Tran
(74) *Attorney, Agent, or Firm* — Pearl Cohen Zedek; Latzer Baratz LLP (57) ABSTRACT

A system and method for authenticating data. Data may be received that is individually encrypted in a first encryption layer by each of a plurality of users using user-specific private keys. The received data may be encrypted together in a second encryption layer to create multi-layered encrypted data. The multi-layered encrypted data may be transferred to a beneficiary device to determine if the encrypted data is authentic. At the beneficiary device, the second encryption layer may be decrypted to expose the first encryption layer. Then, the first encryption layer may be decrypted using public keys that only decrypt data encrypted by private keys assigned to a plurality of authorizers pre-designated to authenticate the data. If the first encryption layer is properly decrypted using the authorizers' decryption keys, it may be determined that the users are the pre-designated authorizers.

20 Claims, 4 Drawing Sheets

(56) References Cited

U.S. PATENT DOCUMENTS

| | | |
|---|---|---|
| 6,189,009 B1 | 2/2001 | Stratigos et al. |
| 6,216,116 B1 | 4/2001 | Barkan et al. |
| 6,237,095 B1 | 5/2001 | Curry et al. |
| 6,237,096 B1 * | 5/2001 | Bisbee et al. ............ 713/178 |
| 6,253,322 B1 | 6/2001 | Susaki et al. |
| 6,298,442 B1 | 10/2001 | Kocher et al. |
| 6,314,409 B2 | 11/2001 | Schneck et al. |
| 6,317,834 B1 | 11/2001 | Gennaro et al. |
| 6,321,339 B1 * | 11/2001 | French et al. .............. 726/2 |
| 6,327,656 B2 | 12/2001 | Zabetian |
| 6,332,193 B1 | 12/2001 | Glass et al. |
| 6,353,812 B2 | 3/2002 | Frankel et al. |
| 6,367,013 B1 | 4/2002 | Bisbee et al. |
| 6,431,439 B1 | 8/2002 | Suer et al. |
| 6,446,050 B1 | 9/2002 | Kondo et al. |
| 6,499,665 B1 | 12/2002 | Meunier et al. |
| 6,526,506 B1 * | 2/2003 | Lewis ...................... 713/153 |
| 6,584,656 B1 * | 7/2003 | Karmeli ..................... 24/705 |
| 6,598,131 B2 * | 7/2003 | Kedem et al. ............. 711/147 |
| 6,598,161 B1 * | 7/2003 | Kluttz et al. .............. 713/166 |
| 6,725,209 B1 | 4/2004 | Iliff |
| 6,725,220 B2 | 4/2004 | Stratigos et al. |
| 6,754,820 B1 | 6/2004 | Scheidt et al. |
| 6,757,826 B1 | 6/2004 | Paltenghe |
| 6,845,453 B2 | 1/2005 | Scheidt et al. |
| 6,910,129 B1 | 6/2005 | Deng et al. |
| 6,941,285 B2 * | 9/2005 | Sarcanin ..................... 705/67 |
| 6,947,556 B1 | 9/2005 | Matyas, Jr. et al. |
| 6,957,339 B2 | 10/2005 | Shinzaki |
| 6,978,380 B1 | 12/2005 | Husain et al. |
| 6,990,513 B2 | 1/2006 | Belfiore et al. |
| 7,007,298 B1 | 2/2006 | Shinzaki et al. |
| 7,024,562 B1 | 4/2006 | Flink et al. |
| 7,039,805 B1 | 5/2006 | Messing |
| 7,107,454 B2 | 9/2006 | Mori et al. |
| 7,174,460 B2 | 2/2007 | Horita et al. |
| 7,178,030 B2 | 2/2007 | Scheidt et al. |
| 7,263,551 B2 | 8/2007 | Belfiore et al. |
| 7,306,560 B2 | 12/2007 | Iliff |
| 7,395,436 B1 | 7/2008 | Nemovicher |
| 7,627,765 B2 | 12/2009 | Nakamura et al. |
| 7,693,279 B2 | 4/2010 | Chen et al. |
| 2001/0011220 A1 | 8/2001 | Frankel et al. |
| 2001/0021926 A1 | 9/2001 | Schneck et al. |
| 2001/0025272 A1 | 9/2001 | Mori et al. |
| 2002/0023220 A1 * | 2/2002 | Kaplan .................... 713/176 |
| 2002/0059143 A1 | 5/2002 | Frankel et al. |
| 2002/0059425 A1 | 5/2002 | Belfiore et al. |
| 2002/0062291 A1 | 5/2002 | Zoka |
| 2002/0069179 A1 | 6/2002 | Slater et al. |
| 2002/0143704 A1 | 10/2002 | Nassiri |
| 2002/0143711 A1 | 10/2002 | Nassiri |
| 2002/0150241 A1 | 10/2002 | Scheidt et al. |
| 2002/0164036 A1 | 11/2002 | Stransky et al. |
| 2003/0012374 A1 | 1/2003 | Wu et al. |
| 2003/0044050 A1 | 3/2003 | Clark et al. |
| 2003/0163428 A1 | 8/2003 | Schneck et al. |
| 2003/0172034 A1 | 9/2003 | Schneck et al. |
| 2004/0015704 A1 | 1/2004 | De Schrijver |
| 2004/0039912 A1 | 2/2004 | Borrowman et al. |
| 2004/0049463 A1 | 3/2004 | Kwon |
| 2004/0162984 A1 | 8/2004 | Freeman et al. |
| 2004/0181756 A1 | 9/2004 | Berringer et al. |
| 2004/0205358 A1 | 10/2004 | Erickson |
| 2004/0236694 A1 | 11/2004 | Tattan et al. |
| 2004/0255120 A1 | 12/2004 | Botti et al. |
| 2005/0038737 A1 | 2/2005 | Norris |
| 2005/0039018 A1 | 2/2005 | Wittkotter |
| 2005/0044369 A1 | 2/2005 | Anantharaman |
| 2005/0132195 A1 | 6/2005 | Dietl |
| 2005/0132196 A1 | 6/2005 | Dietl |
| 2006/0046842 A1 | 3/2006 | Mattice et al. |
| 2006/0090203 A1 | 4/2006 | Husain et al. |
| 2006/0093241 A1 | 5/2006 | Nakamura et al. |
| 2006/0178997 A1 | 8/2006 | Schneck et al. |
| 2006/0184452 A1 | 8/2006 | Barnes et al. |
| 2006/0248330 A1 * | 11/2006 | Randle et al. ............. 713/155 |
| 2007/0113076 A1 | 5/2007 | Cowburn et al. |
| 2007/0118732 A1 | 5/2007 | Whitmore |
| 2007/0189542 A1 * | 8/2007 | Alldredge ................. 380/283 |
| 2007/0204162 A1 | 8/2007 | Rodriguez |
| 2007/0277040 A1 | 11/2007 | Scheidt et al. |
| 2008/0022089 A1 | 1/2008 | Leedom |
| 2008/0028439 A1 | 1/2008 | Shevade |
| 2008/0092239 A1 | 4/2008 | Sitrick et al. |
| 2008/0155253 A1 | 6/2008 | Liu |
| 2008/0224823 A1 | 9/2008 | Lawson et al. |
| 2010/0014676 A1 * | 1/2010 | McCarthy et al. ........... 380/277 |
| 2010/0153712 A1 * | 6/2010 | Gentry ..................... 713/156 |
| 2010/0169651 A1 | 7/2010 | Scheidt |
| 2012/0140923 A1 * | 6/2012 | Lee et al. ................... 380/45 |
| 2012/0260105 A1 * | 10/2012 | Smith ...................... 713/190 |

FOREIGN PATENT DOCUMENTS

| | | |
|---|---|---|
| DE | 101 54 956 | 5/2003 |
| EP | 1 688 891 | 8/2006 |
| WO | WO 00/42577 | 7/2000 |
| WO | WO 01/35348 | 5/2001 |
| WO | WO 02/32308 | 4/2002 |

* cited by examiner

SYSTEM AND METHOD FOR ELECTRONIC CERTIFICATION AND AUTHENTICATION OF DATA

FIELD OF THE INVENTION

Embodiments of the invention relate to document security. In particular, some embodiments relate to systems and methods for verifying the authenticity of document information and signatures to prevent fraud.

BACKGROUND OF THE INVENTION

Current document authentication relies on the manual inspection of physical markers, such as, stickers, thermal stamps and water marks. However, such manual inspection using the naked eye is highly variable from person to person and highly prone to error, rendering such documents susceptible to fraud.

Accordingly, automated authentication mechanisms have been developed that use encryption keys to digitally mark documents. However, there is currently no guarantee that the intended users hold the keys. If the encryption keys are stolen, they may be used to corrupt documents and commit fraud.

SUMMARY OF EMBODIMENTS OF THE INVENTION

Embodiments of the invention provide systems and methods for authenticating data. Data may be received that is individually encrypted in a first encryption layer by each of a plurality of users using user-specific private keys. The received data may be encrypted together in a second encryption layer to create multi-layered encrypted data. The multi-layered encrypted data may be transferred to a beneficiary device to determine if the encrypted data is authentic. At the beneficiary device, the second encryption layer may be decrypted to expose the first encryption layer. Then, the first encryption layer may be decrypted using public keys that only decrypt data encrypted by private keys assigned to a plurality of authorizers pre-designated to authenticate the data. If the first encryption layer is properly decrypted using the authorizers' decryption keys, it may be determined that the users are the pre-designated authorizers. Furthermore, if decrypting the first encryption layer generates error codes having substantially no errors, it may be determined that the original data is not corrupted and therefore, authentic.

BRIEF DESCRIPTION OF THE FIGURES

Embodiments of the invention are illustrated by way of example and not limitation in the figures of the accompanying drawings, in which like reference numerals indicate corresponding, analogous or similar elements. The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "encrypting", "decrypting", "signing", "verifying", "authorizing", "authenticating", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of devices" may include two or more devices. Unless explicitly stated, the method embodiments described herein are not constrained to a particular order or sequence. Additionally, some of the described method embodiments or elements thereof can occur or be performed simultaneously, at the same point in time, or concurrently.

Embodiments of the invention provide a system and method for authenticating data by a plurality of pre-designated authorizers. All of the authorizers may sign the data, e.g., using personalized private keys, to authenticate the data. A data manager may provide the data and/or designated the plurality of authorizers. In one embodiment, the data input to be signed or encrypted may include the original data to be authenticated and/or information associated with the signing authorizers, for example, transformed using hash functions. Hash functions may provide a compressed fingerprint or code of the input data, such that, any change to the input data may be identified, thereby indicating that the original data is corrupted or not authorized are the designated authorizers.

Embodiments of the invention may secure documents or data by applying multiple layers of encryption, for example, to the hash codes or other data. A first encryption layer may be designated for a plurality of (N) authorized users to encrypt the data. A second encryption layer may be designated for an organization (or a representative thereof, such as, a president or company administrator) to encrypt the data. A certificate or security authority may issue each authorizer and/or organization a private key uniquely associated therewith. The (N) authorizers may individually sign or encrypt the data using their respective private keys. All (N) encrypted versions of the data may be combined, for example, as a hash, sequence, series, weighted sum, or any other function, to accumulate all of the individual authorizers' encryptions. For the second encryption layer, the organization's private key may be applied to the combined data to generate multi-layered encrypted data.

Once the data is encrypted, e.g., as multi-layered encrypted data, the data may be transferred, directly or indirectly, to an authenticating or beneficiary device with the associated public keys. The associated public keys may be uniquely paired with (and only decrypt data encrypted by) the respective private keys assigned to the plurality of pre-designated authorizers (to decrypt the first layer) and the organization (to decrypt the second layer). The public key(s) uniquely designated to decrypt only data encrypted using the organization's private key(s), may be used to attempt to decrypt the second encryption layer. If the decryption is successful, i.e., if the organization's public key was successfully used to decrypt the encrypted document, it can be concluded that the document was encrypted using the organization's private key, thereby indicating that the data was indeed encrypted by the organization, and no error is detected in the hash codes indicating that the original data is not tampered or corrupted.

Once the second encryption layer is successfully decrypted, the first encryption layer may be exposed for decryption. The public keys uniquely designated to decrypt only the private keys of the plurality of pre-designated authorizers may be used to attempt to decrypt the first encryption layer. As described with respect to the organization, above, decryption may be successful if the public and private keys fit for one or more of the authenticators, indicating that the data is indeed encrypted by the plurality of pre-designated authorizers, and if substantially no error is detected in the hash codes indicating that the original data is not corrupted. If both the first and second layers are successfully decrypted, the original data may be authorized. However, if any of the data is corrupted (reflected in the decrypted hash codes) or if even one of the (N) users or the organization that encrypt the data is not an authorized or registered user (indicated by the failure of their public keys to decrypt the data), the data may not be authorized.

The first encryption layer may enable each user to separately encrypt their own version or copy of the data independently, for example, without waiting for or receiving input from any other user. Accordingly, the data manager may edit or change the (N) authorizers pre-designated to authenticate the data. For example, the data manager may add, delete, swap, replace or otherwise change the pre-designated authorizers. Such changes may be made up until authentication is requested, which triggers completion and transfer of the multi-layered encrypted data. Accordingly, staff changes (e.g., someone gets promoted), new company structures (e.g., changes in security clearance or divisions of departments), limited authorizer availability (e.g., authorizers unavailable due to vacation), etc., may all be managed by this flexible designation of authorizers. In the meantime, while the list of authorizers is being finalized, each user may proceed to authorize independently. In one example, a data manager may only want verification from a predetermined number of authorizers. The data manager may send the data to a greater pool of potential authorizers and when satisfied, e.g., once the data is verified by the predetermined number of authorizers, may designate those as the final set of authorizers.

The second encryption layer may be applied, in addition to the authorizer-encrypted first layer, for example, to provide additional security by receiving additional verification and encryption from an organization. Although, an authorizer generally refers to an individual and an organization generally refers to a company, group, or agency, authorizers and organizations may refer to any individuals, groups, ranks, security levels, departments, or any types of one or more users. Typically, authorizers and organizations refer to different types of users.

Decryption keys may be public (or less restricted) so that anyone (or a designated class of users) may decrypt a document in order to determine data authenticity, while encryption keys may be private or unique so that only the designated authorizers and organization may verify the data. In one embodiment, the encryption keys may be asymmetric encryption keys.

Figure 1:
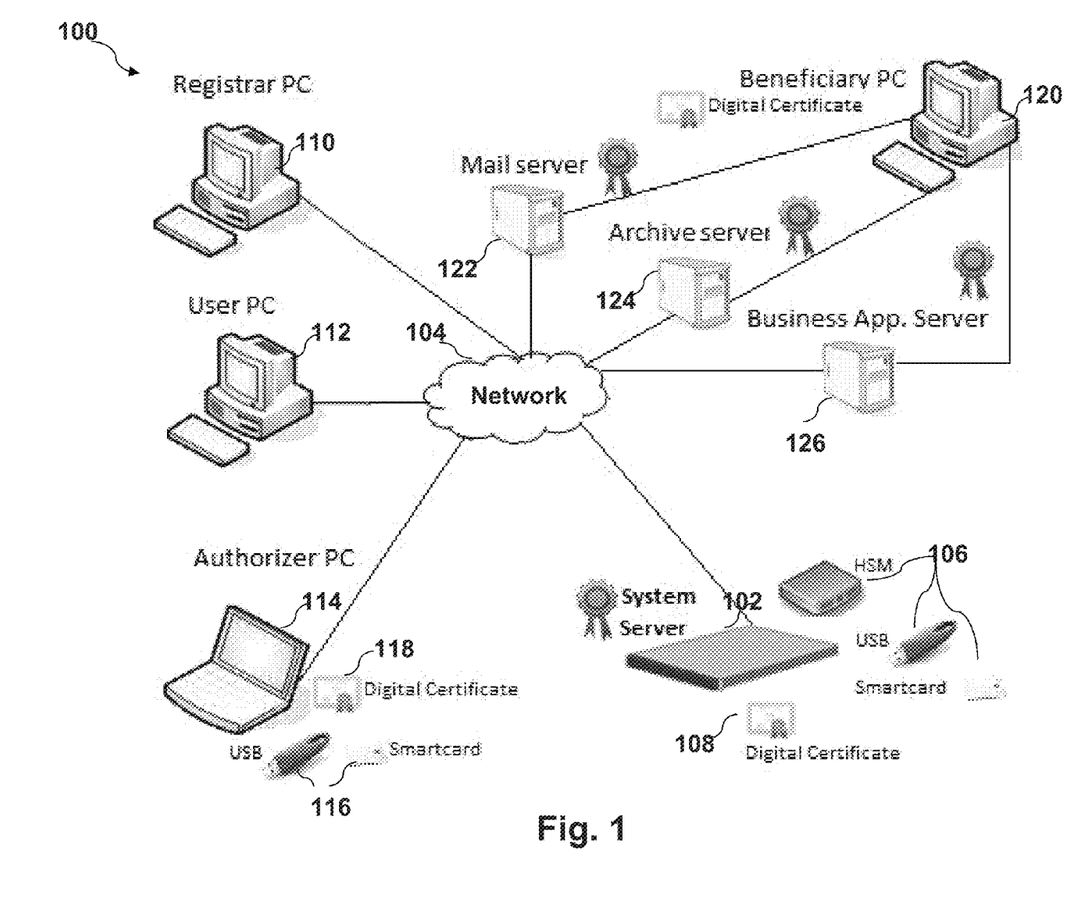
FIG. 1 is a schematic illustration of a system for authenticating data according to an embodiment of the present invention.

Reference is made to FIG. 1, which schematically illustrates a system 100 for authenticating data according to an embodiment of the present invention.

System 100 may include a system server 102 running a web application over a secure and trusted network 104. System server 102 may include or may be connected to a memory device 106, such as, a universal serial bus (USB), a smartcard or hardware secure module (HSM), that stores a digital certificate to verify the authenticity of a user or organization. The digital certificate may include a private key 108 issued uniquely to an organization, such as, a company, department, agency, administrator or other individual or group of users. The organization's private key 108 may be obtained from a certificate authority that issues and keeps records of each user's or organization's digital certificate keys.

System 100 may include one or more system registrar(s) 110, one or more authorizer(s) 114 and one or more data managers(s) 112, e.g., computer devices operated by users, connected via trusted server network 104. Registrar 110 may register authorizers 114 in system 100. Each authorizer 114 may include or may be connected to a memory device 116 that stores its unique private key 118 to verify the authenticity of that authorized user. Data manager 112 may provide data to be authenticated (e.g., documents, messages, etc.), designate one or more authorizers 114 to authorize the data and/or designate one or more beneficiaries 120 to receive the data.

The data to be authenticated may be transformed by hash functions and signed or encrypted multiple times to generate multi-layered encrypted data. For example, authorizers 114 may each sign or encrypt the data using their respective authorizer private keys 118 to generate a first layer of encrypted data. After the authorizer signatures, system server 102 may further sign or encrypt the data using its organization private key 108 to generate a second layer of encrypted data. Each signature or encryption may be applied to a hash function of the original dataset (and authorizer or organization information), thereby reflecting any changes to the original data itself. Data structures used to encrypt the data are described in greater detail in reference to FIGS. 2A-2C. Data manager 112 may change or edit the final list of designated authorizers and/or the destination or beneficiaries 120 of the data at any time before the data is certified, for example, when the organization's private key 108 is used to generate the second and final layer of encrypted data.

According to some embodiments of the invention, the authorization process may be performed in a streamlined fashion, for example, using rules. For example, upon creation of a document for authentication, the system may analyze the content of the document and determine based on business rules which individuals in the organization, or which members of certain categories or officers of the organization must authorize the document. For example, if the document is determined to be a contract, the rules may establish that the vice president of operations, the general counsel, and at least one officer of the company must sign the document. The system may then forward the document to the vice president of operations and the general counsel for authentication. In addition, the system may forward to all officers of the company for authentication, and wait for one to authenticate the document, or it may send to each one in turn until one authenticates the document. In some embodiments, the type of document may be identified manually by its creator using a metadata field in a document management system, or the document creator may manually identify the individuals or categories of individuals that must to authenticate the document.

Once the authorizers are established (by identity, or by category), the system may further streamline the authorization process. For example, in some embodiments, the system may send emails to registered addresses of the authorizers, notifying them that a document is awaiting their authorization, and inviting them to access the document, for example, sending them a hyperlink to the universal resource locator (URL) where the document is located. The document may be associated with a deadline by which time the document must be authenticated by all authorizers and/or by the organization, and the system may send reminders to authorizers who have not yet responded until they respond.

There may also be an order of authorization among authorizers. For instance, in the above example, based on their rakings in the corporate hierarchy, the vice president of operations may be required to authorize first, then only after the vice president of operations has authorized the document, the general counsel may be asked to authorize the document, and lastly, only after the vice president of operations and the general counsel have authorized the document, the officer of the company may be asked to authorize the document.

After the data is encrypted, the encrypted data may be sent to beneficiary 120, e.g., via a mail server 122 as an electronic mail (e-mail) message, archive server 124 as archival data, or business application server 126 as business data. Beneficiary 120 may decrypt the multi-layered encrypted data layer-by-layer, for example, using public keys associated with the pre-designated authorizers and organization. The public may be obtained from the certificate authority or transferred together with the encrypted data, as described in reference to FIGS. 2A-2C.

Beneficiary 120 may initially attempt to decrypt the second (last signed) encryption layer using the public key paired to organization key 108. If the decryption is unsuccessful, the device that encrypted the data may be a non-designated or fraudulent device or the input data may have been changed or corrupted. In either case, beneficiary 120 may invalidate, discard or otherwise discredit the data. However, if the proper organization system server 102 did indeed encrypt the data and the data was not corrupted, the decryption may be successful thereby exposing the first encryption layer. Beneficiary 120 may then attempt to decrypt the first encryption layer using the public keys respectively paired to authorizers' keys 118 for each authorizer 112 designated by data manager 114. If the data cannot be decrypted or the decrypted data is corrupted, beneficiary 120 may invalidate, discard or otherwise discredit the data. However, if the data is decrypted, the authorizers of the data are the designated authorizers 112, and if additionally substantially no errors are detected in the decrypted data, the original data may be authenticated. It may be noted that some minor error may be expected due to error in data transmissions, but such errors are substantially small (e.g., on the order of one in ever $10^3$ or fewer bits) and may be distinguished from errors due to corrupted data, which are more frequent or dense (e.g., on the order of one in 10 or more bits).

Figure 2A:
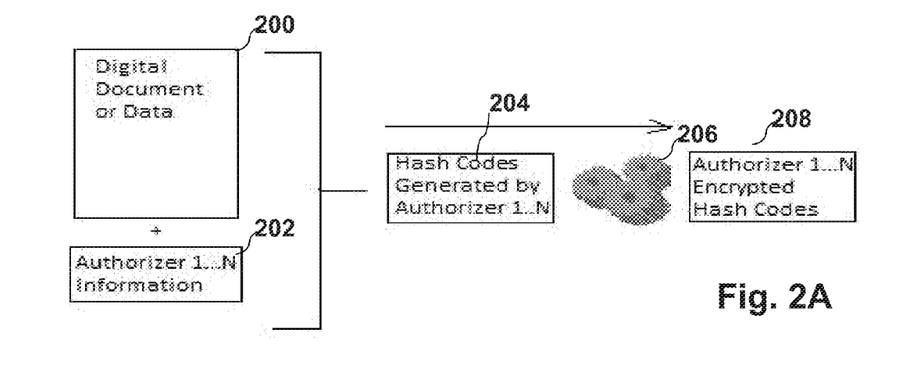
FIGS. 2A-2C are schematic illustrations of data structures signed or encrypted for authentication according to embodiments of the present invention.
Figure 2B:
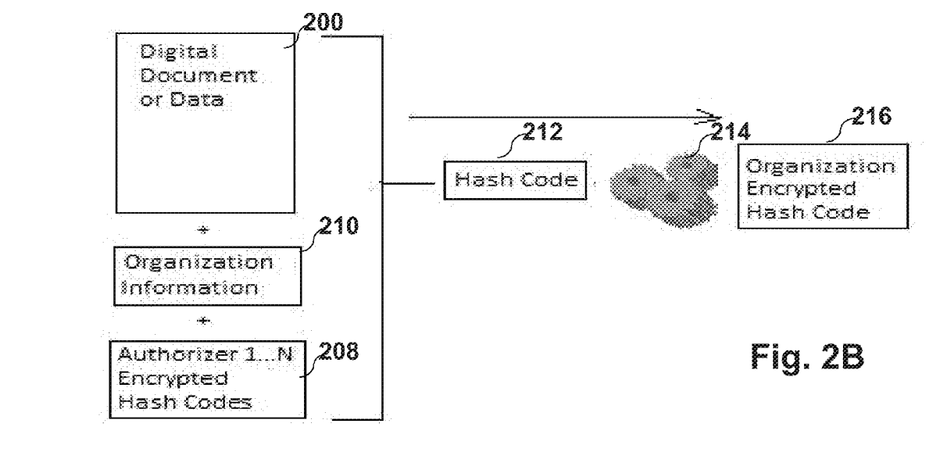
Figure 2C:
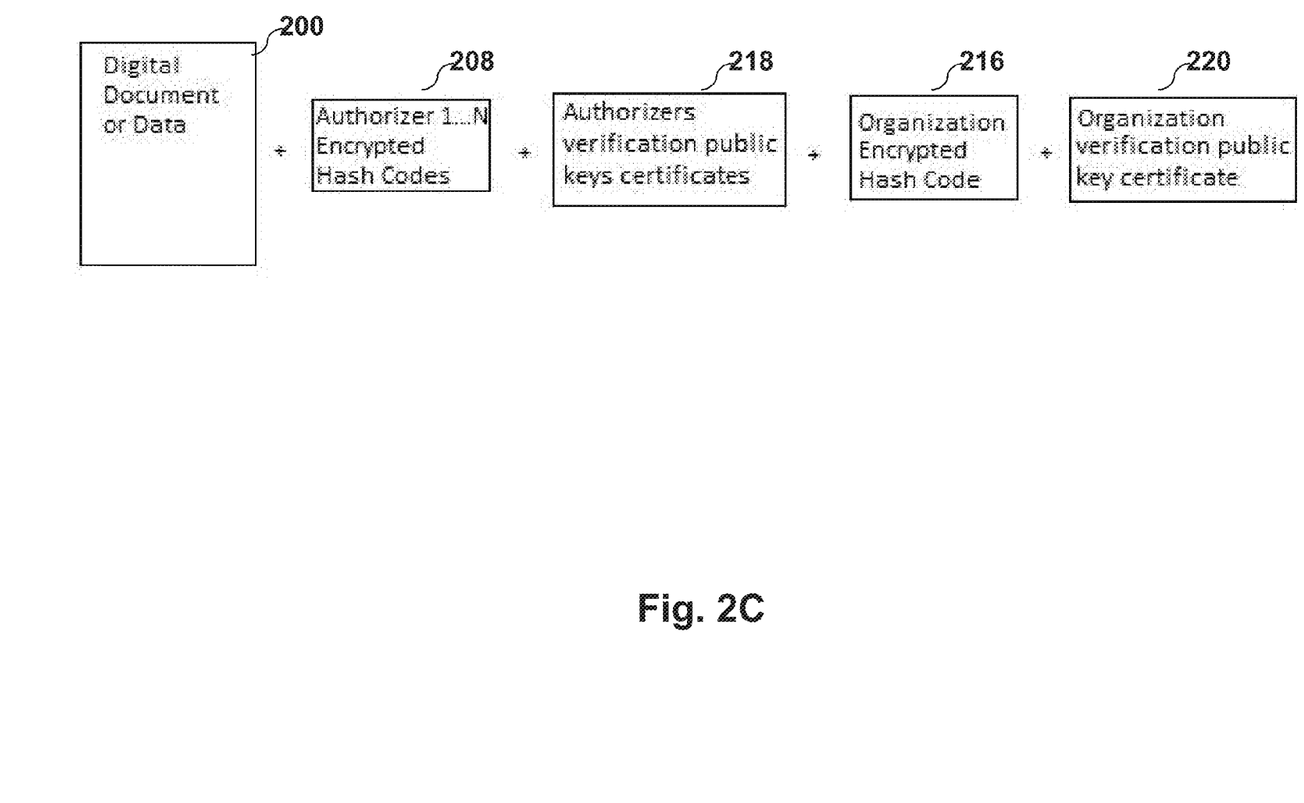

Reference is made to FIGS. 2A-2C, which schematically illustrate data structures signed or encrypted for authentication according to embodiments of the present invention. The data structures of FIGS. 2A-2C may be encrypted and/or decrypted by devices of FIG. 1.

FIG. 2A illustrates data structures encrypted by each (ith) authorizer (e.g., authorizers 112 of FIG. 1) in a first layer of a multi-layered encryption. The first layer encryption may input original data 200 to be authenticated and information 202 associated with (N) pre-designated authorizers (e.g., provided by data manager 114 of FIG. 1). Each (ith) authorizer (i=1, ..., N) may combine original data 200 and information 202 associated with that ith authorizer to generate hash codes 204 defining the combined data. Hash codes 204 may be a function of every (or most) data bits of original data 200 and information 202 to reflect if any of these data structures has been corrupted. The (ith) authorizer may then sign or encrypt hash codes 204 using the authorizer's unique key 206 (e.g., key 118 of FIG. 1) to generate authorizer encrypted hash codes 208. This process may be repeated (N) times for each of the (N) authorizers to output (N) authorizers encrypted hash codes 208, which may be used as input in the second encryption layer of FIG. 2B.

FIG. 2B illustrates data structures encrypted by a system server (e.g., system server 122 of FIG. 1) in a second layer encryption. The (N) authorizers encrypted hash codes 208 may be input into the second layer encryption, along with the original data 200 and information 210 associated with an organization. The organization may be explicitly designated by or implicitly associated with a data manager (e.g., data manager 114 of FIG. 1). The input data may be combined and hash codes 212 may be generated based on the combined data. The system server may use a digital certificate key 214 unique to the organization (e.g., key 108 of FIG. 1) to sign or encrypt hash codes 212 to generate organization encrypted hash codes 216.

FIG. 2C illustrates data structures sent to a beneficiary (e.g., beneficiary 120 of FIG. 1) to authenticate (or conversely, to invalidate) original data 200. Data structures sent to the beneficiary may include, for example, original data 200, authorizers encrypted hash codes 208, authorizers verification public key certificates 218 (e.g., the public key paired to the designated authorizers' private keys), organization encrypted hash codes 216, and organization verification public key certificates 220 (e.g., the public key paired to the designated organization's private keys). The beneficiary may use public key certificates 218 to decrypt authorizers encrypted hash codes 208 and organization verification public key certificates 220 to decrypt organization encrypted hash codes 216. If either set of encrypted hash codes 208 or 216 cannot be decrypted, the beneficiary may determine that the key does not belong to the proper authorizer or organization (e.g., the document was signed by a fraudulent party). If encrypted hash codes 208 or 216 are decrypted but the decrypted data is erroneous, the beneficiary may determine that the input data was corrupted. In either case of unsuccessful decryption, original data 200 is not authenticated. However, if both sets of encrypted hash codes 208 or 216 are decrypted without error, the beneficiary may authenticate original data 200.

Figure 3:
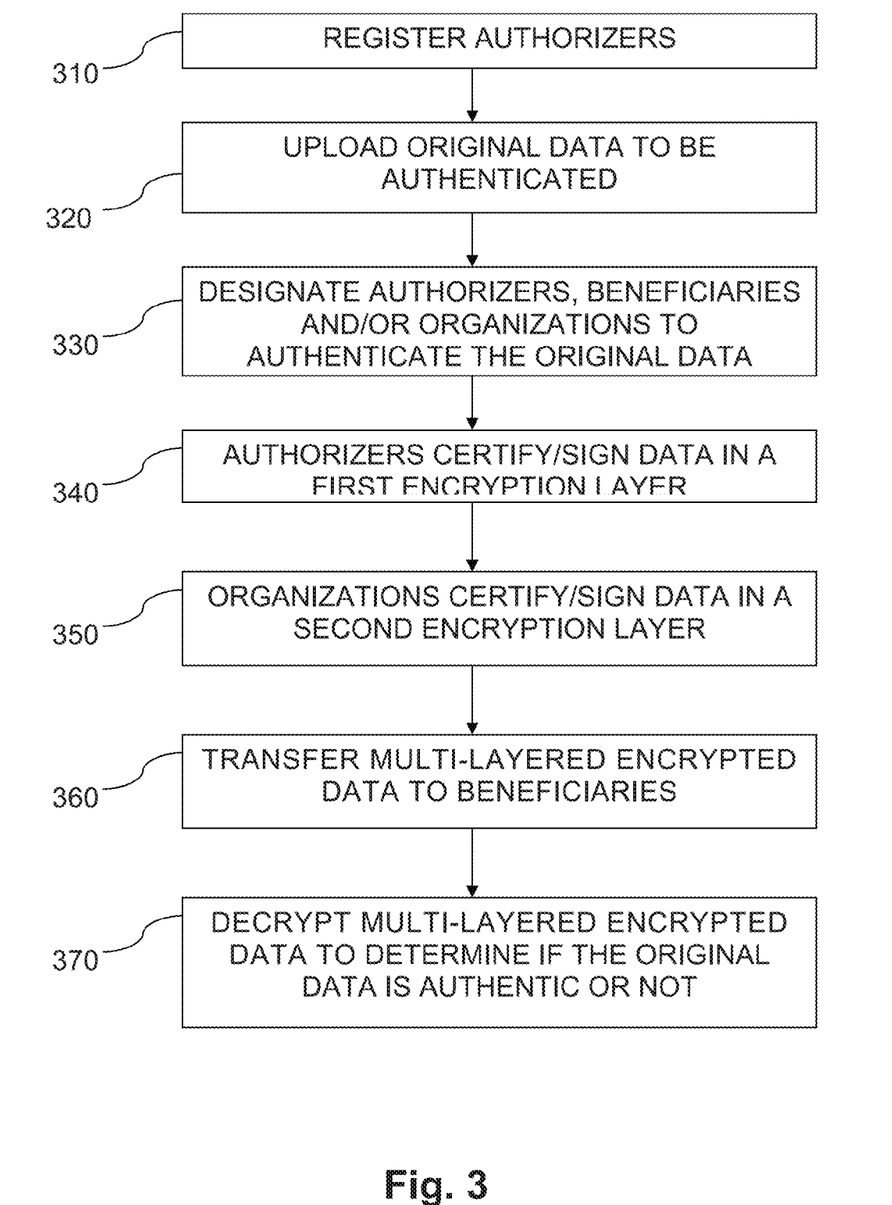
FIG. 3 is a flowchart diagram illustrating a method for authenticating data according to embodiments of the present invention.

Reference is made to FIG. 3, which is a flowchart diagram illustrating a method for authenticating data according to embodiments of the present invention. The method of FIG. 3 may be executed using the devices of FIG. 1.

In operation 310, a registrar (e.g., registrar 110 of FIG. 1) may register authorizers (e.g., authorizers 112 of FIG. 1) in a system (e.g., system 100 of FIG. 1), for example, using a registration interface. The authorizers may access the registration interface, for example, by logging-in using web browsers from their respective computer devices, and entering their identification information.

In operation 320, a data manager (e.g., data manager 112 of FIG. 1) may log-in to the system and upload original data, such as, digital documents, for example, using a web browser from their computer device. The system's security protocol automatically prevents any changes to the uploaded original data.

In operation 330, the data manager may designate authorizers to approve the uploaded data, for example, by selecting their names, departments, identification codes, etc., from a list of potential authorizers registered in the system. The data manager may designate the beneficiary or recipient(s) of the data or, may designate a class, department or security level that may be such a beneficiary. Alternatively, any device may have the potential to be a beneficiary, for example, mediated by a security authority determining which devices may gain access to the proper public keys to decrypt the data. The data manager may explicitly designate or select one or more organization to authorize the uploaded data or such organization may be implicitly or automatically designated, for example, when the system only recognizes one organization, when the authorizers are automatically assigned or linked to the organization(s) or when the data manager is automatically linked to the organization(s). The selected authorizers, beneficiaries and/or organizations designated for this data may be changed at any time before the organization certifies the document, for example, in operation 350.

In operation 340, designated authorizers (e.g., verified via their registered log-in) may each certify or sign data to generate a first encryption layer. Each authorizer may certify or sign data, for example, by encrypting hash code of the original data and authorizer information, using the authorizer's digital private key (e.g., private key 118 of FIG. 1). The authorizers may obtain their respective private keys from a certificate authority and may store the private keys, for example, in a USB, smartcard, HSM or other external memory (e.g., memory device 116 of FIG. 1) connected to their respective computer devices.

In operation 350, after all the designated authorizers sign the data, the organization's system server (e.g., system server 102 of FIG. 1) may certify or sign data to generate a second encryption layer. The organization may certify or sign data, for example, by encrypting hash code of the original data, the authorizers encrypted hash codes generated in operation 340 and organization information, using the organization's digital private key (e.g., private key 108 of FIG. 1). The organization may obtain their private key from a certificate authority and may store the private key, for example, in a USB, smartcard or HSM or other external memory (e.g., memory device 106 of FIG. 1) connected to their system server.

In operation 360, the organization's system server may transfer the multiple encryption layers of the data to the beneficiaries, e.g., designated in operation 330. The multi-layered encrypted data may include, for example, the original data uploaded in operation 320, the authorizers encrypted hash codes generated in operation 340, and/or the organization encrypted hash codes generated in operation 350. The beneficiaries may receive the data, for example, via a mail server (e.g., mail server 122 of FIG. 1), an archive server (e.g., archive server 124 of FIG. 1) or a business application server (e.g., business application server 126 of FIG. 1).

In operation 370, the beneficiaries may determine if the original data is authentic (or not) by decrypting the multi-layered encrypted data, for example, as follows:

a. Decrypt the second layer of encrypted data using the organization's public key, for example, obtained from a certificate authority. The second layer decryption may return hash code that the organization encrypted, which may be compared with hash code of the original data and the authorizers encrypted hash codes.

b. Decrypt the first layer of encrypted data using each designated authorizer's public key, for example, obtained from a certificate authority. The second layer decryption may return hash code that each authorizer encrypted, which may be compared to hash code of the original data.

The beneficiaries may determine that the data is authentic if each layer may be decrypted (indicating the layer was encrypted or signed by the authorizers designated in operation 330) and the decrypted hash codes match the compared hash codes (indicating the transferred original data and hash codes are not corrupted). Otherwise the beneficiaries may determine that the data is inauthentic or corrupt.

Other operations or orders of operations may be used.

Embodiments of the invention may enable users to modify a list of authorizers that are designated to authorize original digital documents/data before the system certifies these digital documents/data.

Embodiments of the invention may protect digital documents/data uploaded into the system from changes by authorizers signing the data. Authorizers may sign the data, for example, by encrypting the hash codes of the digital data and the authorizer information using the authorizers' digital private key obtained from a certificate authority stored in at the authorizers' computers.

Embodiments of the invention may certify digital documents/data after all authorizers have signed the document/data, for example, by encrypting the hash code of the digital documents/data, organization information and all of the encrypted hash codes of the digital document/data and the authorizers information, using an organization's digital private key obtained from a certificate authority stored in the system server.

Embodiments of the invention may send the digital document/data, authorizers encrypted hash codes (of digital document and authorizers' information), authorizers verification public keys certificates, organization encrypted hash codes (of digital document/data, organization information and encrypted hash codes of digital document/data and authorizers information) and organization verification public key certificate to a beneficiary, for example, via an e-mail, archive or business application trusted server.

According to embodiments of the invention, the beneficiaries may verify that authorizers, which are authorized by the organization to sign a particular document or data, have signed the document/data and that substantially no changes are allowed to the document, for example, by:

a. Using the organization public key stored in the organization verification public key certificate, digitally signed by the certificates authority to authenticate it as the public key of the identified organization to decrypt the hash code that the organization encrypted and comparing it with the hash code of the digital document/data, organization information and authorizers encrypted hash codes.

b. Using each authorizer public key stored in the authorizer verification public key certificate, digitally signed by the certificates authority to authenticate it as the public key of the identified authorizer to decrypt the hash code of each authorizer encrypted hash code and comparing it with the hash code of the document/data and authorizer information.

Such embodiments may verify the signing authorizers are indeed the proper authorizers and that the data/document (defined by the hash codes) has substantially no errors.

In some embodiments of the invention, to authenticate a document/data, the document/data may have substantially no error. It may be noted that some minor error in the original data or in the hash codes thereof may be expected due to device errors during data transmissions, storage and processing errors. However, these errors are substantially small (e.g., affecting bits on the order of one in every $10^3$ or fewer) and may be distinguished from errors due to corruption or fraud, which are more frequent or dense in at least some portions of the document/data (e.g., affecting bits on the order of one in every 10 or more). Alternatively, in other embodiments of the invention, the document/data may have absolutely no error for authentication.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for authenticating data, the method comprising:
    receiving data individually encrypted in a first encryption layer by each of a plurality of users each user using a different user-specific private key, the data comprising a hash code for each user, each hash code generated based on at least the same document;
    encrypting the received individually encrypted data together in a second encryption layer to create multi-layered encrypted data wherein the second encryption layer is encrypted using an organization-specific private key uniquely assigned to an organization; and
    transferring the multi-layered encrypted data to a device that has an organization-specific public key for decrypting the second encryption layer and public keys that only decrypt data encrypted by private keys assigned to a plurality of pre-designated authorizers to determine if the users are the pre-designated authorizers.

2. The method of claim 1, wherein the plurality of authorizers are pre-designated by a data manager.

3. The method of claim 2, wherein changes to the pre-designated authorizers are able to be received from the data manager at any time prior to encrypting the second encryption layer.

4. The method of claim 3 comprising, if the data manager attempts to change the pre-designated authorizers after the request to authenticate the data is received, sending the data manager a message indicating a lock out from editing the pre-designated authorizers.

5. The method of claim 1, wherein each hash code is generated based at least on information associated with an associated user.

6. The method of claim 1, wherein the authorizers define individuals, groups, ranks, security levels, departments, or types of authorizers.

7. The method of claim 1, wherein the encryption keys are asymmetric encryption keys.

8. The method of claim 1 comprising storing the multi-layered encrypted data at a secure server.

9. A method for authenticating original data, the method comprising:
    receiving multi-layered encrypted data comprising a hash code for each of a plurality of users, each hash code generated based on at least the same document, wherein a first encryption layer is individually encrypted by a plurality of users each using a different user-specific private key, which is in turn combined and encrypted in a second encryption layer using an organization-specific private key uniquely assigned to an organization;
    decrypting the second encryption layer to expose the first encryption layer using an organization-specific public key corresponding to the organization-specific private key;
    attempting to decrypt the first encryption layer using public keys that only decrypt data encrypted by private keys assigned to a plurality of authorizers pre-designated to authenticate the data; and
    determining that the users are the pre-designated authorizers only if the first encryption layer is properly decrypted using the authorizers' decryption keys.

10. The method of claim 9, wherein the plurality of authorizers are pre-designated by a data manager.

11. The method of claim 10, wherein changes to the pre-designated authorizers are able to be received from the data manager at any time prior to encrypting the second encryption layer.

12. The method of claim 9, comprising determining that the original data is not corrupted if decrypting the first encryption layer generates hash codes having substantially no errors.

13. A system for authenticating data, the system comprising:
    a memory to store multi-layered encrypted data comprising a hash code for each of a plurality of users, each hash code generated based on at least the same document, wherein a first encryption layer is individually encrypted by a plurality of users each using a different user-specific private key, which is in turn combined and encrypted in an encryption layer using an organization-specific private key uniquely assigned to an organization; and
    a processor to transfer the multi-layered encrypted data to a beneficiary device, wherein the beneficiary device is adapted to:
    decrypt the second encryption layer to expose the first encryption layer using an organization-specific public key corresponding to the organization-specific private key, attempt to decrypt the first encryption layer using public keys that only decrypt data encrypted by private keys assigned to a plurality of authorizers pre-designated to authenticate the data, and determine that the users are the pre-designated authorizers only if the first encryption layer is properly decrypted using the authorizers' decryption keys.

14. The system of claim 13 comprising a certificate authority to issue each user their user-specific private keys and to issue the corresponding public keys for use by the beneficiary device.

15. The system of claim 13 comprising a device operated by a data manager to pre-designate the plurality of authorizers.

16. The system of claim 15, wherein the device operated by a data manager is able to change the pre-designated authorizers at any time prior to the encryption of the encryption layer.

17. The system of claim 13, wherein the beneficiary device determines that the original data is not corrupted if decrypting the first encryption layer generates hash codes having substantially no errors.

18. The method of claim 1 wherein the second layer comprises information associated with an entity designated to encrypt the second layer.

19. The method of claim 9, wherein each hash code is generated based at least on information associated with an associated user.

20. The system of claim 13, wherein each hash code is generated based at least on information associated with an associated user.

* * * * *